United States Patent [19]
Lester et al.

[11] Patent Number: 5,737,731
[45] Date of Patent: Apr. 7, 1998

[54] METHOD FOR RAPID DETERMINATION OF AN ASSIGNED REGION ASSOCIATED WITH A LOCATION ON THE EARTH

[75] Inventors: Joseph Olk Lester; Scott David Blanchard, both of Mesa; Dean Paul VandenHeuvel, Chandler, all of Ariz.

[73] Assignee: Motorola, Inc., Schaumburg, Ill.

[21] Appl. No.: 692,109

[22] Filed: Aug. 5, 1996

[51] Int. Cl.⁶ ............................................. G06F 12/08
[52] U.S. Cl. ......................... 707/1; 707/10; 701/13; 701/23; 701/207; 701/220; 701/224; 701/225; 455/40; 455/426; 455/427; 455/432
[58] Field of Search .................. 707/10, 1; 701/23, 701/13, 207, 220, 224, 225; 455/426, 432, 427, 40

[56] References Cited

U.S. PATENT DOCUMENTS

| | | | |
|---|---|---|---|
| 4,972,319 | 11/1990 | Delorme | 364/419 |
| 5,030,117 | 7/1991 | Delorme | 434/130 |
| 5,252,978 | 10/1993 | Priestley et al. | 342/29 |
| 5,303,286 | 4/1994 | Wiedeman et al. | 455/428 |
| 5,445,524 | 8/1995 | Jones | 434/153 |
| 5,457,736 | 10/1995 | Cain et al. | 455/439 |
| 5,527,001 | 6/1996 | Chazelle et al. | 701/301 |
| 5,594,780 | 1/1997 | Wiedeman et al. | 455/430 |
| 5,678,175 | 10/1997 | Stuart et al. | 455/13.1 |
| 5,684,989 | 11/1997 | Nissato | 395/839 |

OTHER PUBLICATIONS

Kotsubo et al., "Development and use of a mobile geographic information system." Vehicle, Road & Traffic Intelligence Soc, pp. 1666–1671, Nov. 1995.

French, L., "The future role of vehicular navigation in relieving urban traffic congestion", Navigation, vol. 36, No. 144, pp. 461–470, Oct. 1988.

Ito, S., "Decentralized location registration information storage method for multimedia services in mobile communication networks.", IEEE, pp. 263–267, Nov. 1995.

*Primary Examiner*—Thomas G. Black
*Assistant Examiner*—Jean R. Homere
*Attorney, Agent, or Firm*—Walter W. Nielsen

[57] ABSTRACT

A global communication system must comply with service restrictions when operating across political and other restrictive boundaries. The location of a subscriber unit must be correlated to a service area region for identifying and extending appropriate restrictions and services. The Earth is partitioned into equally spaced areas (125, 130) with entries stored in database records. Service area boundary data (205) overlays the equally spaced areas (125, 130) to assign each equally spaced area to a location area enabling efficient use of the communication system. Equally spaced areas (125, 130) are iteratively subdivided to form a hierarchical database (350) when service area boundary data (205) bisects an equally spaced area (125, 130).

18 Claims, 7 Drawing Sheets

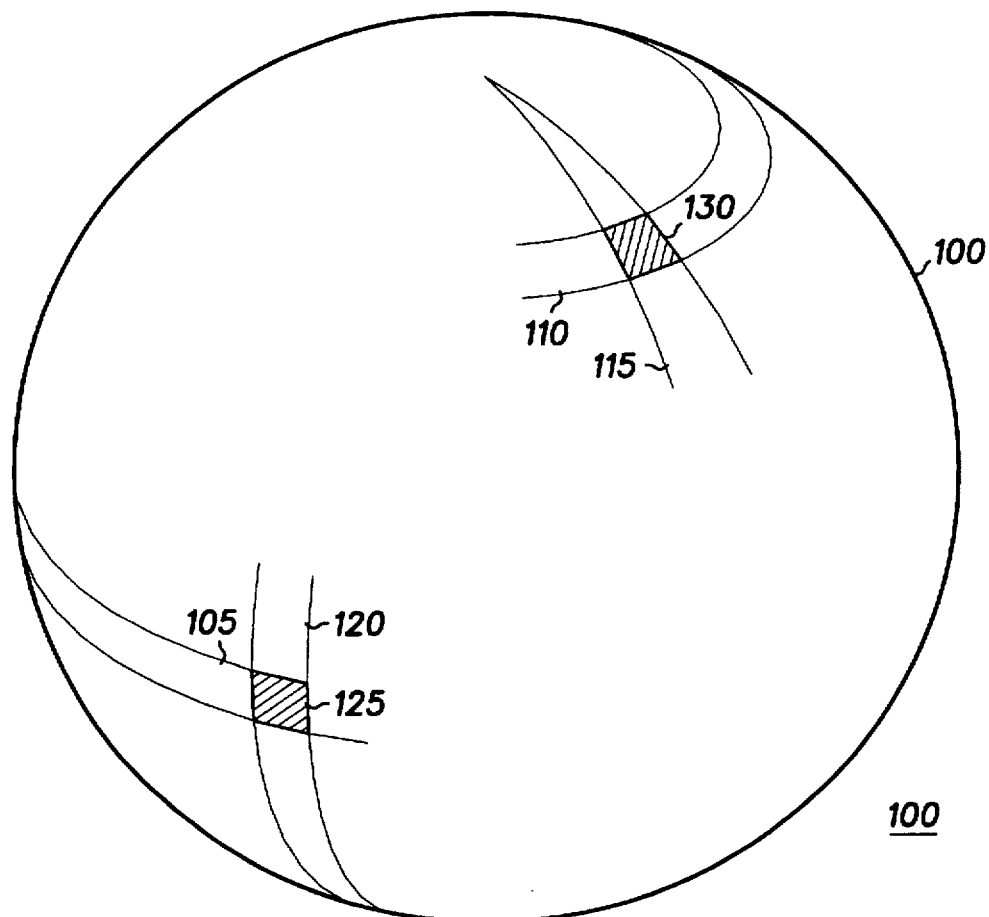
FIG. 1
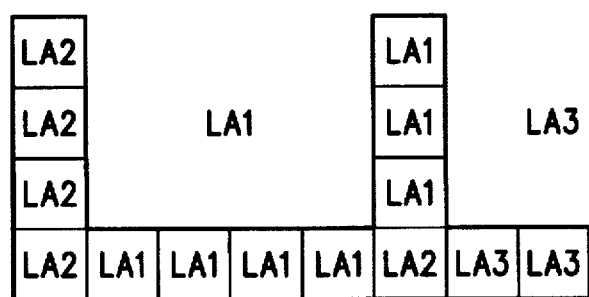
FIG. 4
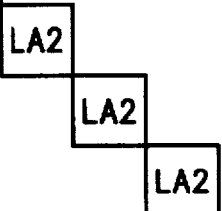

METHOD FOR RAPID DETERMINATION OF AN ASSIGNED REGION ASSOCIATED WITH A LOCATION ON THE EARTH

FIELD OF THE INVENTION

The present invention relates generally to the field of radio communication and, more particularly, to the field of associating a location on the Earth with a defined area having specialized functions and defined privileges.

BACKGROUND OF THE INVENTION

Wireless communication systems have historically been local systems governed and controlled by a local service provider. Such local systems control subscriber unit access by extending services only to subscriber units actively registered and current in other obligations such as in payment of user fees. In these typical systems, subscriber units may freely migrate throughout the system and access is only bounded or restricted by the spatial transmission limitation of a communication system.

Such local systems have even been extended by the use of negotiated roaming agreements wherein a subscriber unit may access a visited system when roaming into the region serviced by the visited system. All such systems, both local and visited, freely accommodate subscriber units operating within their systems without regard to their precise location therein. However, as communication systems become global, other non-service provider restrictions are imposed upon subscriber units. Individual countries may impose restrictions and prohibit subscriber units from operating within their boundaries. Even though the global communication infrastructure may be present in these countries, observance of their restrictions must be observed and respected. Furthermore, for efficient routing of communication with a subscriber unit, a global communication system desirably knows a location area wherein a subscriber unit is located to locally and efficiently direct communications only into a location area immediately surrounding a subscriber unit.

It is apparent that in a global communication system, a subscriber unit's location must be determined to evaluate the services to extend and the efficient localized delivery of those services to a particular subscriber unit. Therefore, a subscriber unit's location must be evaluated against an authorized service area map. Such maps generally are stored in databases for computerized searches and evaluation. Known technologies use databases of vectors to define areas on the Earth. Use of these technologies require more computational time to search a very large database.

Thus, what is needed is a method for generating a database for correlating a present location of a subscriber unit on the Earth with a location area enabling an efficient localized interface between a global communication system and a subscriber unit. Also, what is needed is a method for searching a database for correlating the present location of the subscriber unit with the location area corresponding to the subscriber unit. What is yet needed is a method for generating a database for correlating a present location of a subscriber unit on the Earth with a service area having uniform operating privileges for a subscriber unit and controlled by a communication service provider. Finally, what is needed is a method for searching such a service area database and determining a service area for a subscriber unit by correlating the present location with a service area.

BRIEF DESCRIPTION OF THE DRAWINGS

A more complete understanding of the present invention may be derived by referring to the detailed description in claims when considered in connection with the Figures, wherein like reference numbers refer to similar numbers through the Figures and:

FIG. 1 shows a diagram of the Earth and associated partitioning of its surface in accordance with a preferred embodiment of the present invention;

FIG. 4 illustrates the process for assigning location area designators to equally spaced areas, in accordance with an embodiment of the present invention;

Figure 2:
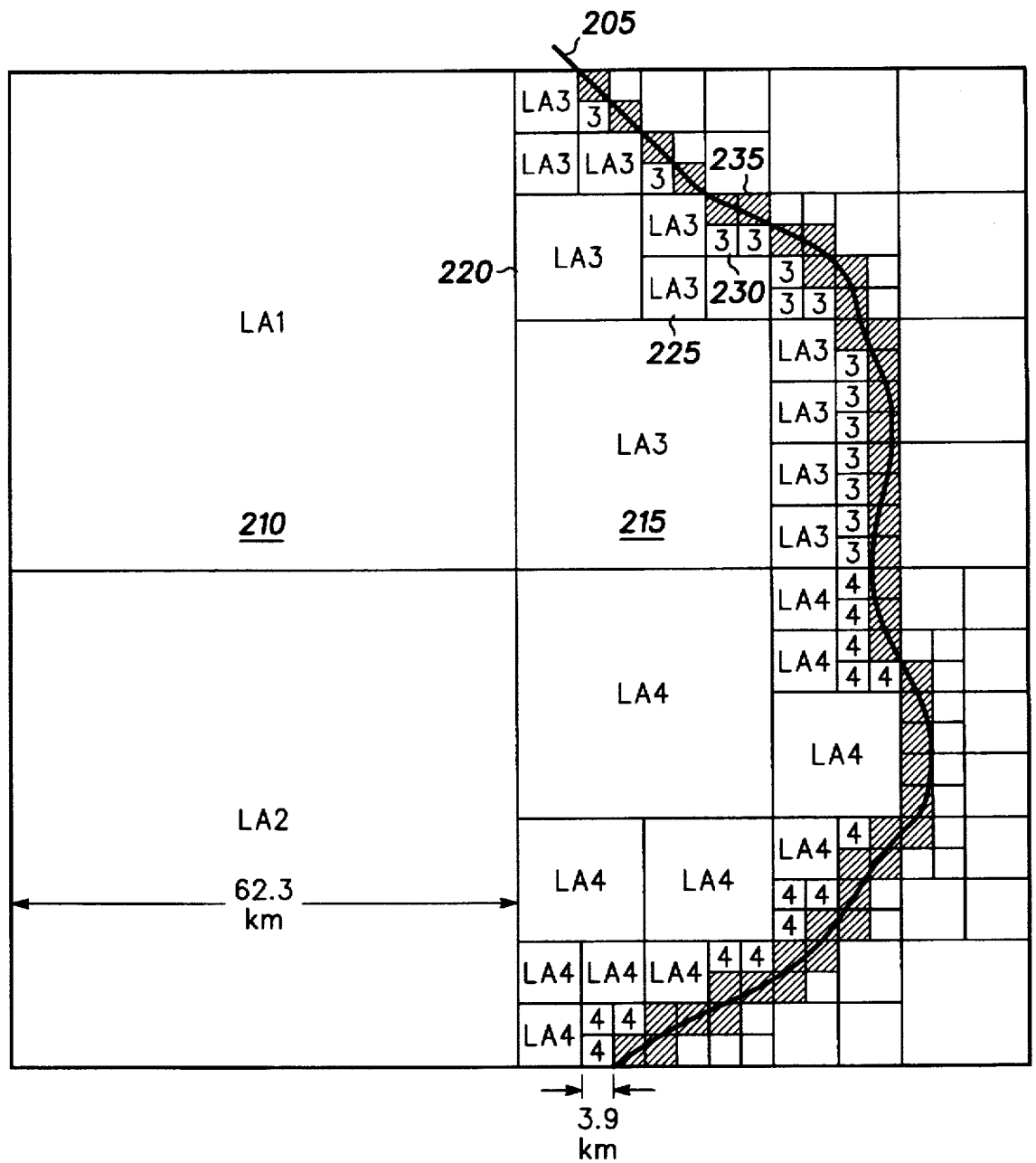
FIG. 2 illustrates traversal of a service area boundary data through equally spaced areas and the partitioning resulting therefrom, in accordance with a preferred embodiment of the present invention.

The exemplification set out herein illustrates a preferred embodiment of the invention in one form thereof, and such exemplification is not intended to be construed as limiting in any manner.

DETAILED DESCRIPTION OF THE DRAWING

The present invention provides among other things, a method for generating a database of hierarchical records for correlating a present location of a subscriber unit on the Earth with a location area controlled by a communication service provider. The location areas denote functionally uniform operable regions wherein a communication service provider may uniformly employ parameters such as a single set of communication channels, direct the same set of paging messages to that local, or direct a call destined for a particular subscriber unit to a location area thus allowing some roaming area for a subscriber unit. The database is preferably generated by partitioning the Earth into a plurality of equally spaced areas, and then overlaying service area boundary data denoting service areas controlled by the communication service providers within the equally spaced areas. Then when one of the equally spaced areas contains any service area boundary data, the equally spaced area is further partitioned into additional smaller equally spaced areas recorded in the next level of the database. Finally, when the equally spaced areas do not contain any service area boundary data, a location area is assigned and recorded for each of the equally spaced areas.

The present invention also provides a method for searching a database to correlate a present location of a subscriber unit on the Earth with a location area corresponding to said present location. The database is preferably searched by receiving the present location of the subscriber unit, and computing which of the originally partitioned plurality of equally spaced areas encompasses the present location. The database is then indexed and traversal of the hierarchical database continues when a record indicates more than one location area for that record. The resolution of the database or the hierarchy is then traversed to a more detailed level until one of the hierarchical records denotes a single location area. The location area is then retrieved and assigned to the subscriber unit and its present location.

The present invention yet provides a method for generating a database for correlating a present location of a subscriber unit on the Earth with a service area defining a region having uniform operating privileges for the subscriber unit. The data base is generated by searching a location area database having hierarchical records wherein some of the records have service area boundary data. Each of the records of the location area database that have boundary data are then duplicated into the service area database.

Finally, the present invention provides a method for determining a service area for a subscriber unit by correlating a present location of the subscriber unit on the Earth with a service area defining a region having uniform operating privileges for said subscriber unit. The service area is preferably determined by generating a present location probability region about the present location by defining the present location as the origin of the probability region. The service area database is then searched for entries or records encompassed by the present location probability region. The service area is then resolved from these database records.

FIG. 1 shows a diagram of the Earth and associated partitioning of its surface in accordance with a preferred embodiment of the present invention. In a space based or global communication system the present location of a subscriber unit must be estimated, and this location must then be associated with an area on the surface of the Earth 100. This area may be defined by a service area (SA) denoted by the boundaries of a country for purposes of system access or billing, or it may be a location area (LA) designated by the system for purposes of defining an area about which a subscriber unit may move and still be found by the system for purposes of alerting the subscriber unit that an incoming call is pending.

Due to the mobility of subscriber units, the location area of a user must be updated frequently. This implies that the location areas must be computed many times per second in some systems. Also, in order to maximize the use of system resources, the size of the location areas should be small, resulting in a large quantity of location areas. The present invention generates databases for searching and determining these areas for accommodating efficient and compliant service to subscriber units.

Referring to FIG. 1, the Earth 100 is divided into L equally spaced areas 125 and 130. Latitude partitions or bands 105 and 110 are defined, in the preferred embodiment, having an equivalent height. Equally spaced areas 125 and 130 are defined as having roughly equivalent areas. In order for equally spaced areas 125 and 130 to have equal area with an approximately constant height, the width must be varied as a function of latitude. Latitude partition 115 located nearer a pole, will have equally spaced areas that are approaching a pie-shape. If the height of the pie-shaped area remains consistent through all latitude partitions, then the width of each equally spaced area is a function of the latitude of the latitude partition. A longitude partition 115, unique to latitude band 110, creates equally spaced area 130, while a longitude partition 120, unique to latitude partition 105, creates equally spaced area 125. It should be apparent that the quantity of equally spaced areas on latitude partition 105 exceeds the quantity of equally space areas on latitude partition 110. The quantity of L equally spaced areas are chosen by weighing the desire for high resolution and the requirement to keep the size of the database small.

FIG. 2 illustrates traversal of a service area boundary data through equally spaced areas and the partitioning resulting therefrom, in accordance with a preferred embodiment of the present invention. Four equally spaced areas are shown with a service area boundary data 205 traversing two of the equally spaced areas. Equally spaced areas 210 and 211 are shown without any service area boundary data traversing therethrough. A location area number is assigned to an equally spaced area when it is not traversed or bisected by service area boundary data. Equally spaced service area 210 and 211 are shown as being assigned location area #1 and location area #2, respectively.

When service area boundary data 205 traverses equally spaced areas, the present invention further partitions equally spaced areas into a smaller partitioning or cluster of equally spaced areas. Upon further partitioning, equally spaced area 215 no longer is traversed by service area boundary data 205 and is assigned a location area number, (e.g., location area #3). Nothing prevents equally spaced area 210 and equally spaced 215 from being assigned the same location area numbers, thus forming a more irregularly shaped region.

Upon subsequent partitioning, an equally spaced area 220 is no longer traversed by service area boundary data 205 and is assigned a location area number, (e.g., location area #3). Yet, upon further subsequent partitioning, equally spaced area 225 is no longer traversed by service area boundary data 205 and is assigned a location area number, (e.g., location area #3). Finally, upon further subsequent partitioning, equally spaced area 230 is no longer traversed by service area boundary data 205 and is assigned a location area number, (e.g., location area #3). Such iterative partitioning may continue on to the capable resolution, or as in the preferred embodiment, a present size of each iterativly partitioned equally spaced area is evaluated against a minimum resolution requirement defining an acceptable tolerance of approximation of the boundaries of an equally spaced area. As shown in FIG. 2, an equally spaced area 235 still remains bisected by service area boundary data 205, however, no further partitioning occurs. In the preferred embodiment, in addition to storing an assigned location area number and service area number, the smallest partition retains an indicator denoting the bisection of service area boundary data 205, as noted by the shaded equally spaced area. Minimum resolutions in the preferred embodiment are approximately 3-5 km.

As an example, assume that the Earth is divided into $2^{17}$ equally spaced areas so that L would be equal to 131,072. Since the surface of the Earth is approximately 511 million square kilometers, this results in an area of 3899 $km^2$ for each square, or a square width approximately 62.4 km on a side. For this example, this area would then be subdivided or re-partitioned at most four more time to arrive at a minimum resolution requirement of approximately 4 km per side.

Figure 3:
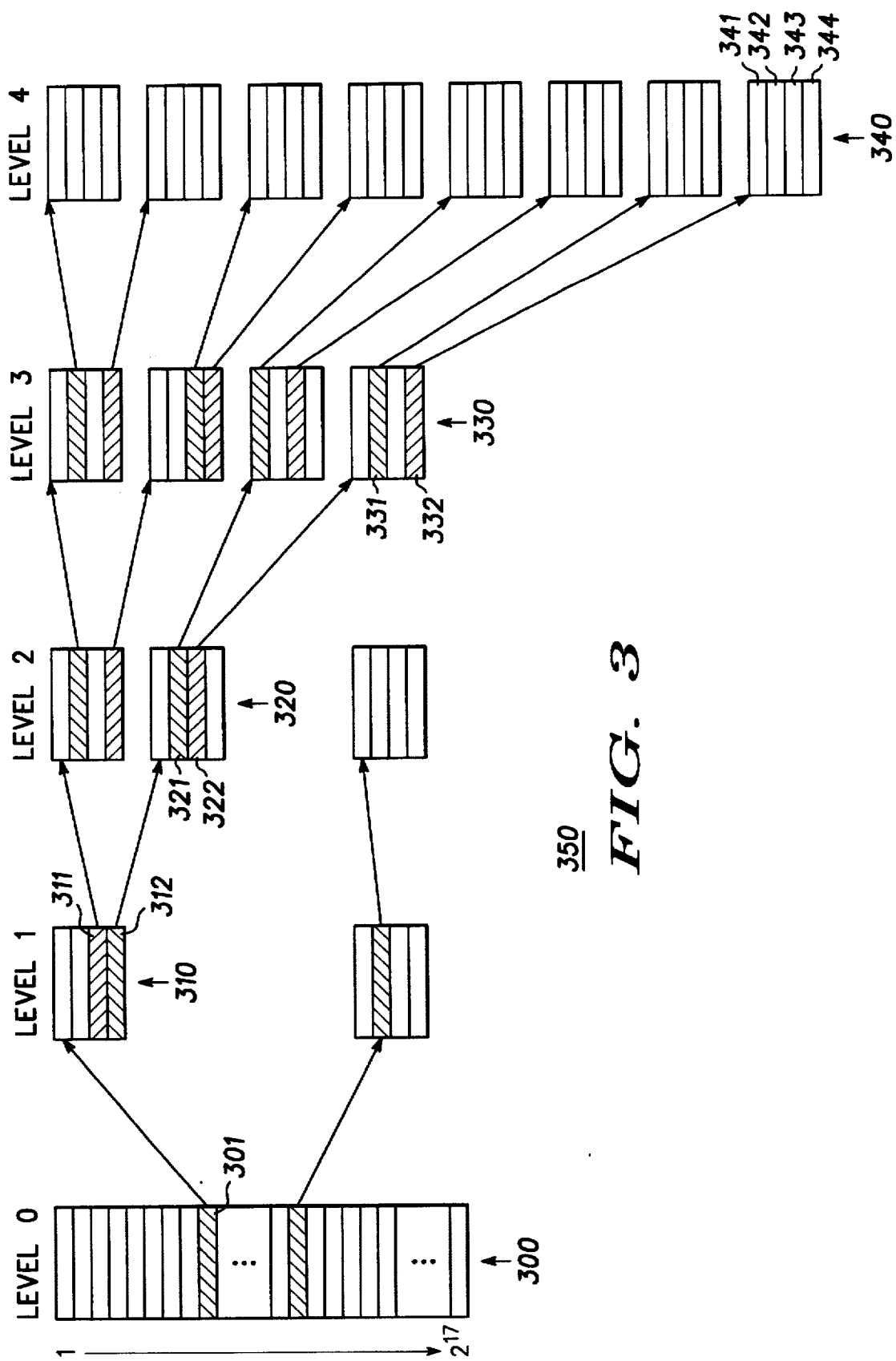
FIG. 3 illustrates a hierarchical database for storing records and facilitating a search of such records, in accordance with a preferred embodiment of the present invention.

FIG. 3 illustrates a hierarchical database for storing records and facilitating a search of such records, in accordance with a preferred embodiment of the present invention. Each area in database 350 represents an equally spaced area with the shaded area representing an equally spaced area having service area boundary data located within the equally spaced area. A level 0 table 300 contains records having no service area boundary and records containing service area boundary data. A record 301 points to a level 1 table 310 which further divides the area into four sub-areas, also known as equally spaced areas. In this level 1 table 310, records 311 and 312 contain service area boundary data and pointers to level 2 tables 320. Each of these level 2 tables contain 4 records. Records 321 and 322 in turn point to a level 3 table 330 having records 331 and 332 which point to a final level 4 table 340 having records 341-344. Records 341-344 each contain an entry denoting service area boundary data and an assigned location number. Also, a service area number may be assigned and stored within records 341-344.

Not all records fanout to a higher level. A record 302 on level 0 table 300, points to a record 313 in level 1 table 310 which in turn terminates in records in level 2 table 320. These level 2 records contain the same information as the level 4 table records described above.

FIG. 4 illustrates the process for assigning location area designators to equally spaced areas, in accordance with an embodiment of the present invention. Rules may be devised for assigning location area designators to equally spaced areas containing service area boundary data. FIG. 4 denotes one such method used for assigning location area numbers in accordance with an embodiment of the preferred invention. Equally spaced area records containing service area boundary data preferably are assigned location area numbers by applying a series of queries to determine the location area number assigned to an adjacent equally spaced area that does not contain boundary data. First, an equally spaced area having service area boundary data assumes the location area number of a non-boundary equally spaced area immediately to the left. Secondly, when an equally spaced area having service area boundary data does not have an equally spaced area without service area boundary data immediately to the left, an equally spaced area having service area boundary data assumes the location area number of a non-boundary equally spaced area immediately to the right. Thirdly, when an equally spaced area having service area boundary data does not have an equally spaced area without service area boundary data immediately to the right, an equally spaced area having service area boundary data assumes the location area number of a non-boundary equally spaced area immediately to the top. Fourth and finally, when an equally spaced area having service area boundary data does not have an equally spaced area without service area boundary data immediately to the top, an equally spaced area having service area boundary data assumes the location area number of a non-boundary equally spaced area immediately to the bottom.

In the preferred embodiment, a service area number and a location area number are preferably stored in the database as an array of $2^k$ elements, one for each of the equally spaced areas (e.g., $2^{17}$ in the previous example). Each element of the array preferably requires an entry for a location area number, a service area number, and a pointer to a higher resolution level or a NULL pointer for a terminal node in the array.

In an alternate embodiment, the above grid of equally spaced areas represented as squares, may alternatively be viewed as a grid of points on the surface of the Earth, where the grid increases in resolution near the borders. Each grid point may have a shape other than the squares described above associated with it. For example, each grid point may have a circle associated with it, so that a radius would be stored with each grid point.

Figure 5:
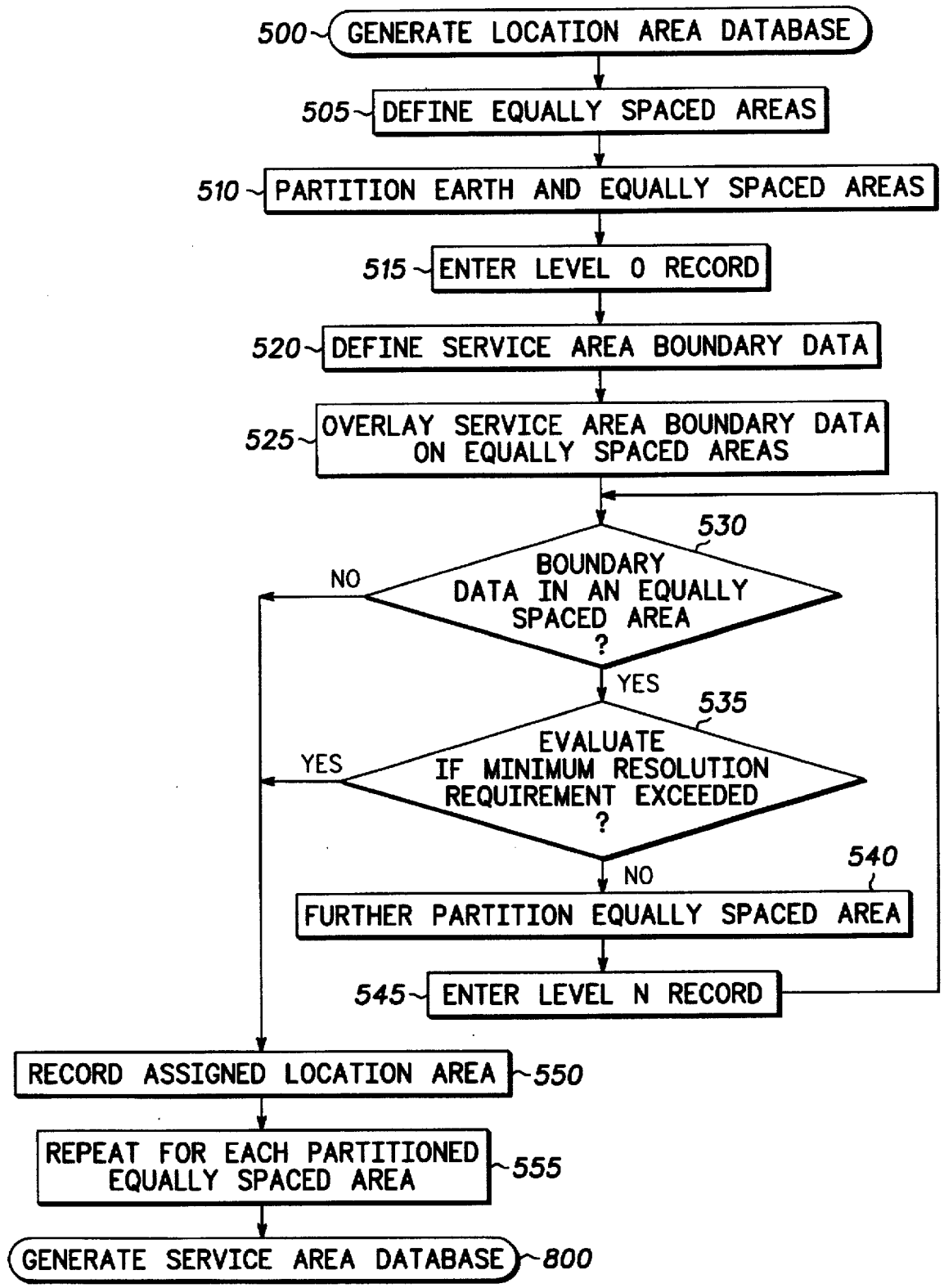
FIG. 5 shows a flowchart for generating a location area database, in accordance with an embodiment of the present invention.

FIG. 5 shows a flowchart for generating a location area database, in accordance with an embodiment of the present invention. A generate location area database process 500 generates a database having a plurality of hierarchical records for correlating a present location of a subscriber unit on the Earth with a location area controlled by a communication service provider. The location area denotes a functionally uniform operable region for a communication service provider.

A task 505 defines the geometry of equally spaced areas. In the preferred embodiment, equally spaced areas are defined to have equal latitude parameters, and varying longitudinal parameters to facilitate an approximately equal area for each of the equally spaced areas.

A task 510 partitions the Earth into a plurality of equally spaced areas. This partitioning generates a level 0 table 300 (FIG. 3) for initial searching and for further partitioning. A task 515 enters this initial partition into the database record.

A task 520 defines service area boundary data 205 (FIG. 2) denoting a boundary having differing access privileges and restrictions for a subscriber unit. In the preferred embodiment, service area boundary data represents communication service provider boundaries, which facilitate billing and access control. Service area boundary data additionally may define a restricted access service area wherein a subscriber unit is prohibited from operating or service area boundary data may represent geopolitical boundaries having unique operation requirements or restrictions.

A task 525 overlays service area boundary data on each of the plurality of equally spaced areas partitioned above. Overlaying preferably occurs by graphically generating an equally spaced area and superimposing service area boundary data thereon. A query task 530 evaluates the equally spaced area with the superimposed service area boundary data to determine if boundary data is contained therein. When service area boundary data is contained therein, a query task 535 evaluates a present size of one of the plurality of equally spaced areas against a minimum resolution requirement. The minimum resolution requirement defines an acceptable tolerance of approximation of the boundaries of the location area.

When the minimum resolution requirement has not been exceeded, a task 540 further partitions the equally spaced areas into additional ones of equally spaced areas. Further partitioning, in the preferred embodiment, takes the form of subdividing an equally spaced area into four relatively equal sized sub-parts also known as equally spaced areas, but nothing limits subdividing into other numbers of partitions or shapes. A task 545 enters a record entry for each of these further divided equally spaced areas into the database. Processing then returns to query task 530 for further evaluation.

When an equally spaced area does not contain any service area boundary data or when evaluation of a minimum resolution of an equally spaced area has been met, a task 550 records the location area assigned to the equally spaced areas. A task 555 repeats the steps 530-550 for each of the equally spaced areas. A generate service area database process 800 (FIG. 8) then proceeds.

Figure 6:
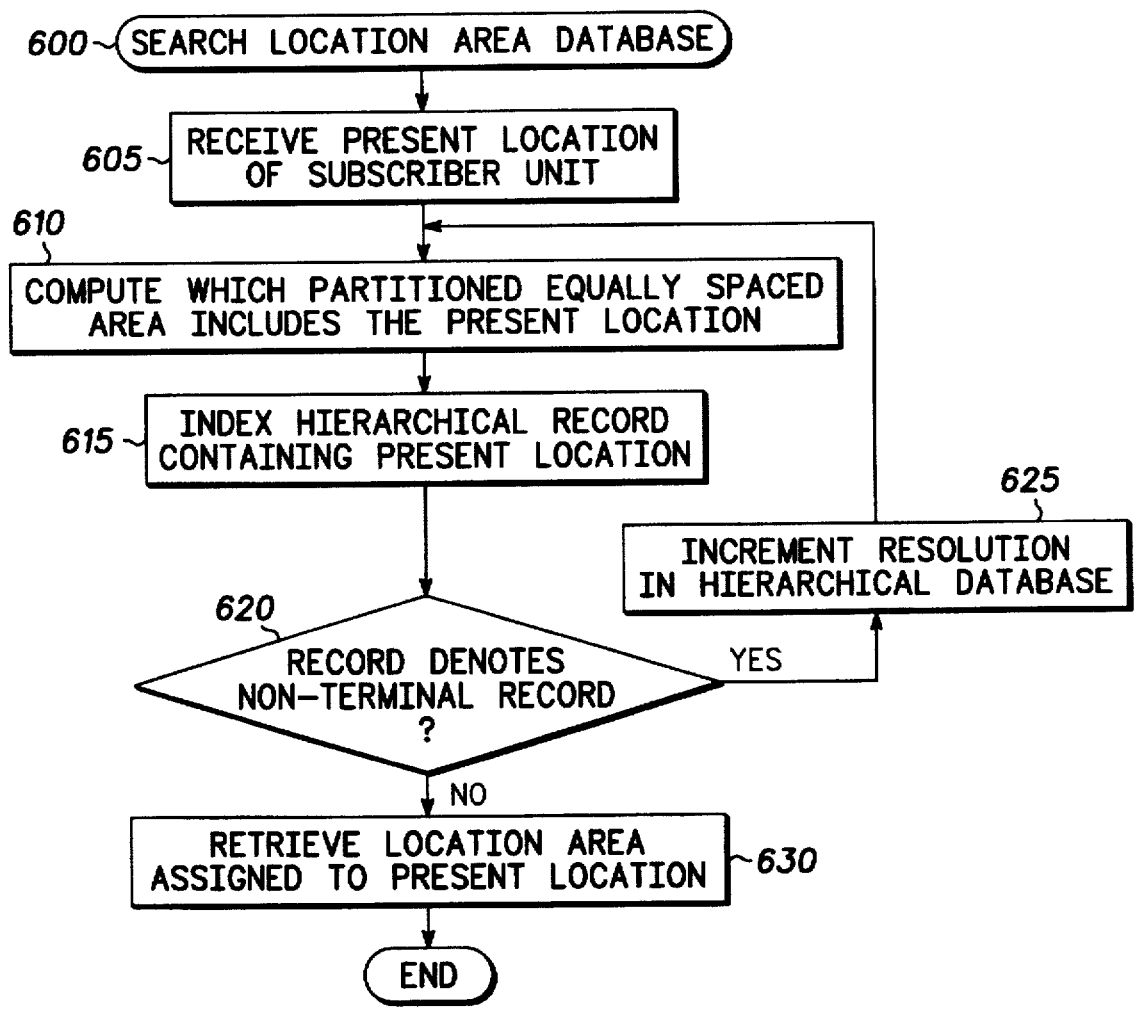
FIG. 6 shows a flowchart for searching a location area database, in accordance with an embodiment of the present invention.

FIG. 6 shows a flowchart for searching a location area database, in accordance with an embodiment of the present invention. A search location area database process 600 searches a database for correlating a present location of a subscriber unit on the Earth with a location area corresponding to said present location and controlled by a communication service provider. The location area denotes a functionally uniform operable region for the communication service provider. Also, the database has a plurality of hierarchical records representing a plurality of equally spaced areas partitioned on the Earth. The equally spaced areas being overlayed with service area boundary data and controlled by a communication service provider as described in FIG. 5.

A task 605 receives the present location of the subscriber unit for determination of a corresponding location area. A task 610 computes which of the plurality of equally spaced areas partitioned on the Earth include the present location. This computation initially begins at the level 0 table detailed in FIG. 3. Subsequent computations potentially evaluate level N table records.

A task 615 indexes one of the hierarchical records that include said present location. A query task 620 determines if one of the hierarchical records denotes more than one location area, or a designator denoting a non-uniform location area or a non-terminal node. When query task 620 denotes a non-uniform location area or a higher resolution pointer pointing to a more detailed level, a task 625 increments the resolution of the hierarchical records to a more detailed level and processing returns to task 610 for further computation and indexing.

When query task 620 determines a record to contain a uniform location area designating a terminal node, a task 630 retrieves the location area assigned to the present location for processing. Such processing includes evaluation of call routing and delivery in the communication network.

Figure 7:
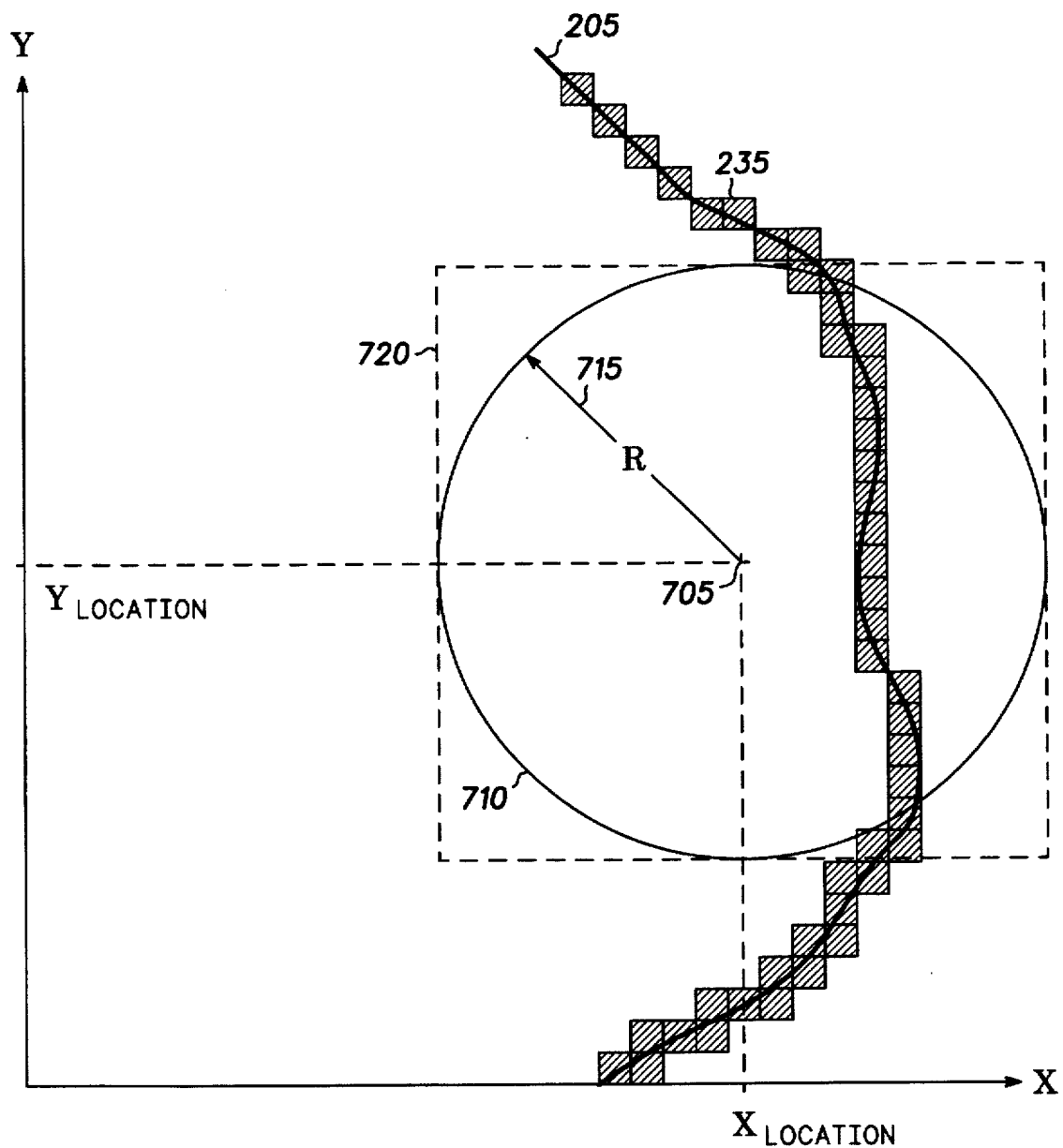
FIG. 7 illustrates a graphical evaluation of a subscriber unit's present location and a probability associated therewith for determining a service area to associate with the subscriber unit, in accordance with a preferred embodiment of the present invention.

FIG. 7 illustrates a graphical evaluation of a subscriber unit's present location and a probability associated therewith for determining a service area to associate with the subscriber unit, in accordance with a preferred embodiment of the present invention. For billing purposes and service restrictions, it is required in global communication system to compute a service area associated with a present location 705 of a subscriber unit. Since location determination is imprecise, a subscriber units location is only known accurately within a radius defined by a present location probability region 710 or 720. Hence, it may be probable that a subscriber unit's service area may be reported as a list of candidate service area with an associated probability for each candidate. For compliant operation, all service areas intersecting the present location probability region must be computed. This computation requires the development or generation of a service area database. The service area database, in the preferred embodiment, only contains the lowest resolution records describing equally spaced area, such as equally spaced area 235, containing service area boundary data 205 from the location area database (FIG. 5).

Figure 8:
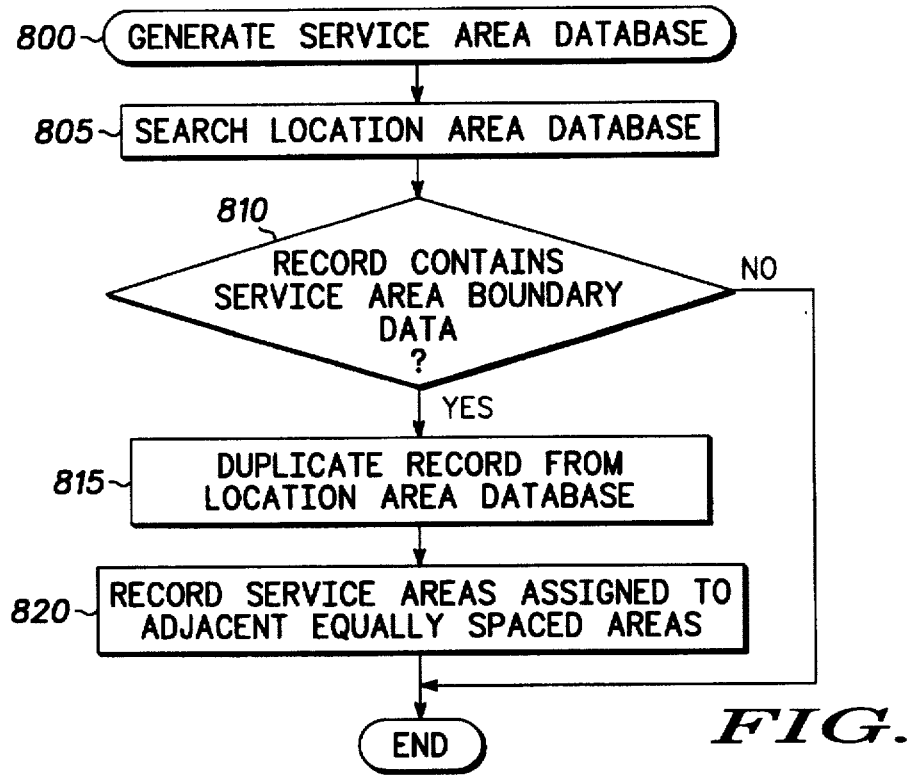
FIG. 8 shows a flowchart for generating a service area database, in accordance with an embodiment of the present invention.

FIG. 8 shows a flowchart for generating a service area database, in accordance with an embodiment of the present invention. A generate service area database process 800 generates a database for correlating a present location of a subscriber unit on the Earth with a service area controlled by a communication service provider. The service area defines a region having uniform operating privileges for the subscriber unit.

A task 805 searches a location area database having a plurality of hierarchical records wherein some of said plurality of records have service area boundary data. The location area database includes a plurality of hierarchical records representing a plurality of equally spaced areas partitioned on the Earth. The equally spaced areas are overlayed with service area boundary data with boundary data being located in only a portion of the equally spaced areas.

A query task 810 evaluates each of the plurality of hierarchical records. When query task 810 determines that an equally spaced area includes service area boundary data, a task 815 duplicates the record from the location area database into the service area database.

For each of the plurality of hierarchical records having said service area boundary data, a task 820 records service areas of the equally spaced areas located adjacent to the equally spaced areas denoted by the plurality of hierarchical records having service area boundary data.

Figure 9:
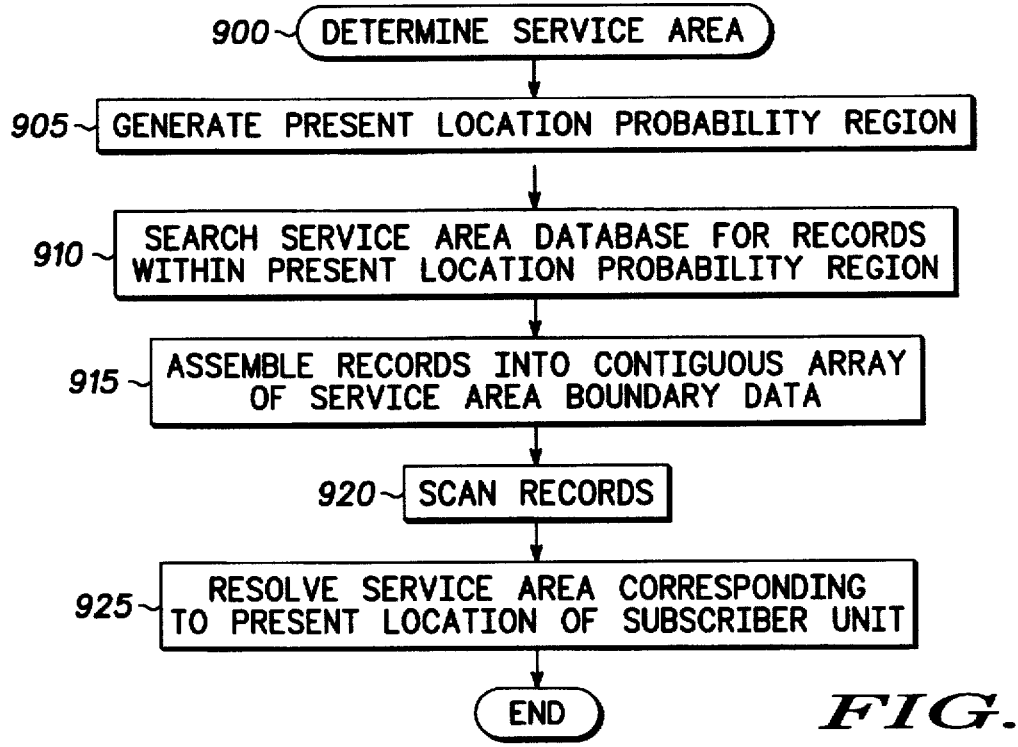
FIG. 9 shows a flowchart for determining a service area for assigning to a subscriber unit, in accordance with a preferred embodiment of the present invention.

FIG. 9 shows a flowchart for determining a service area for assigning to a subscriber unit, in accordance with a preferred embodiment of the present invention. A determine service area process 900 determines a service area for a subscriber unit by correlating a present location of the subscriber unit on the Earth with a service area controlled by a communication service provider. The service area defines a region having uniform operating privileges for the subscriber unit.

A task 905 generates a present location probability region about the present location of the subscriber unit. The present location probability region defines an uncertainty region about the subscriber unit's location that must be considered in determining the privileges to extend and the restrictions to impose upon a subscriber unit operating in this region. Present location probability region may take on many shapes or dimensions to bound such a region. These regions preferably appear as circular probability contour, elliptical contour, or a polygon contour.

A task 910 searches a service area database for entries or records encompassed by the present location probability region. The service area database includes a plurality of records with each having service area boundary data. These plurality of records are derived from a plurality of hierarchical records representing a plurality of equally spaced areas partitioned on the Earth that have been overlayed with service area boundary data.

A task 915 assembles the entries or records encompassed by the present location probability region into a contiguous array of service area boundary data as illustrated in FIG. 7. A task 920 scans the entries following assembly to proportionally weight each of said entries. When a scanned entry is bounded by the present location probability region, the service area information in that entry will be used to determine and resolve the service area associated with the present location of the subscriber unit.

A task 925 resolves the service area corresponding with the present location of the subscriber unit. Resolution of a service area may include resolving a service area list comprising a plurality of potential service areas present in the present location probability region. Also, this list may be weighted according to a probability associates with each entry of the service area list.

In summary, the present invention provides an improved method for generating a database of hierarchical records for correlating a present location of a subscriber unit on the Earth with a location area controlled by a communication service provider. The present invention also provides a method for searching a database to correlate a present location of a subscriber unit on the Earth with a location area corresponding to said present location. The present invention yet provides a method for generating a database for correlating a present location of a subscriber unit on the Earth with a service area defining a region having uniform operating privileges for the subscriber unit. Finally, the present invention provides a method for determining a service area for a subscriber unit by correlating a present location of the subscriber unit on the Earth with a service area defining a region having uniform operating privileges for said subscriber unit.

The present invention has been described above with references to preferred embodiments. However, those skilled in the art will recognize that changes and modifications may be made in these preferred embodiments without departing from the scope of the present invention. For example, those skilled in the art will appreciate that the precise processes, tasks and task sequencing described herein, may be considerably varied while achieving equivalent functions. These and other changes and modifications which are obvious to those skilled in the art are intended to be included within the scope of the present invention.

What is claimed is:

1. A method for generating a database having a plurality of hierarchical records for correlating a present location of a subscriber unit on the Earth with a location area controlled by a communication service provider, said location area denoting a functionally uniform operable region for said communication service provider, said method comprising the steps of:

(a) partitioning the Earth into a plurality of equally spaced areas;

(b) for each of said plurality of equally spaced areas, overlaying service area boundary data denoting service areas controlled by said communication service provider within said each of said plurality of equally spaced areas;

(c) when one of said plurality of equally spaced areas contains any of said service area boundary data, further partitioning said one of said plurality of equally spaced areas into additional ones of said plurality of equally spaced areas;

(d) when said plurality of equally spaced areas do not contain said service area boundary data, recording said location area assigned to said one of said plurality of equally spaced areas; and (e) repeating steps (c) and (d) for each of said plurality of equally spaced areas.

2. The method as recited in claim 1, wherein step (a) further comprises the steps of:

defining said plurality of equally spaced areas having equal latitude parameters; and defining said plurality of equally spaced areas having varying longitudinal parameters to facilitate an approximately equal area of said plurality of equally spaced areas.

3. The method as recited in claim 1, wherein step (b) further comprises the step of:

defining a portion of said service area boundary data as a restricted access service area, said restricted access service area defining an area wherein said subscriber unit is prohibited from operating.

4. The method as recited in claim 1, wherein step (b) further comprises the step of:

defining said service area boundary data to represent geopolitical boundaries.

5. The method as recited in claim 1, wherein step (b) further comprises the step of:

defining said service area boundary data to represent communication service provider boundaries.

6. The method as recited in claim 1, wherein step (c) comprises the steps of:

when one of said plurality of equally spaced areas contains any of said service area boundary data, evaluating a present size of said one of said plurality of equally spaced areas against a minimum resolution requirement, said minimum resolution requirement defining an acceptable tolerance of approximation of said boundaries of said location area; and when said minimum resolution requirement has not been exceeded and when one of said plurality of equally spaced areas contains any of said service area boundary data, further partitioning said one of said plurality of equally spaced areas into additional ones of said plurality of equally spaced areas.

7. The method as recited in claim 1, wherein step (d) further comprises the step of:

further recording a service area associated with said present location included within said one of said plurality of equally spaced areas, said service area defining a region having uniform operating privileges for said subscriber unit.

8. A method for searching a database for correlating a present location of a subscriber unit on the Earth with a location area corresponding to said present location and controlled by a communication service provider, said location area denoting a functionally uniform operable region for said communication service provider, said database having a plurality of hierarchical records representing a plurality of equally spaced areas partitioned on the Earth, said plurality of equally spaced areas being overlayed with service area boundary data and controlled by a communication service provider, said method comprising the steps of:

(a) receiving said present location of said subscriber unit;

(b) computing which of said plurality of equally spaced areas partitioned on the Earth include said present location;

(c) indexing in response to said computing step one of said plurality of hierarchical records that include said present location;

(d) when said one of said plurality of hierarchical records denotes more than one location area, incrementing resolution of said plurality of hierarchical records to a more detailed level;

(e) until said one of said plurality of hierarchical records denotes a single location area, repeating steps (b–d); and (f) retrieving said location area corresponding to said present location of said subscriber unit.

9. The method as recited in claim 8, wherein step (d) further comprises the step of:

evaluating a higher resolution pointer in said one of said plurality of hierarchical records pointing to said more detailed level.

10. A method for generating a database for correlating a present location of a subscriber unit on the Earth with a service area controlled by a communication service provider, said service area defining a region having uniform operating privileges for said subscriber unit, said method comprising the steps of:

(a) searching a location area database having a plurality of hierarchical records wherein some of said plurality of hierarchical records have service area boundary data, said location area database having said plurality of hierarchical records representing a plurality of equally spaced areas partitioned on the Earth, said plurality of equally spaced areas being overlayed with said service area boundary data; and (b) for each of said plurality of hierarchical records having said service area boundary data, duplicating said plurality of hierarchical record into said database.

11. The method as recited in claim 10, further comprising the step of:

(c) for each of said plurality of hierarchical records having said service area boundary data, recording service areas of said plurality of equally spaced areas located adjacent to said plurality of equally spaced areas denoted by said plurality of hierarchical records having said service area boundary data.

12. A method for determining a service area for a subscriber unit by correlating a present location of said subscriber unit on the Earth with said service area controlled by a communication service provider, said service area defining a region having uniform operating privileges for said subscriber unit, said method comprising the steps of:

(a) generating a present location probability region about said present location, said present location defining an origin for said present location probability region;

(b) searching a service area database for records encompassed by said present location probability region, said service area database having a plurality of records with each having service area boundary data, said plurality of records being derived from a plurality of hierarchical records representing a plurality of equally spaced areas partitioned on the Earth, said plurality of equally spaced areas being overlayed with said service area boundary data; and (c) resolving said service area corresponding with said present location of said subscriber unit.

13. A method as recited in claim 12, wherein step (a) further comprises the step of:

bounding said present location probability region by an ellipse having an origin about said present location.

14. A method as recited in claim 12, wherein step (a) further comprises the step of:

bounding said present location probability region by a polygon having an origin about said present location.

15. A method as recited in claim 12, further comprising the step of:

assembling said records encompassed by said present location probability region into a contiguous array of said service area boundary data.

16. A method as recited in claim 15, further comprising the step of:

scanning said records following said assembling step to proportionally weight each of said records prior to said resolving step.

17. A method as recited in claim 15, wherein step (c) comprises the step of:

resolving said service area of said subscriber unit into a service area list.

18. A method as recited in claim 17, wherein said resolving step further comprises the step of:

weighting said service area list according to a probability associated with each entry of said service area list.

* * * * *